United States Patent
Kitagawa et al.

(10) Patent No.: US 11,938,865 B2
(45) Date of Patent: Mar. 26, 2024

(54) SENSOR ATTACHMENT STRUCTURE FOR SIDE PART OF VEHICLE BODY

(71) Applicant: HONDA MOTOR CO., LTD., Tokyo (JP)

(72) Inventors: Akihiro Kitagawa, Wako (JP); Takashi Chirifu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 883 days.

(21) Appl. No.: 16/938,230

(22) Filed: Jul. 24, 2020

(65) Prior Publication Data

US 2021/0031701 A1 Feb. 4, 2021

(30) Foreign Application Priority Data

Jul. 31, 2019 (JP) .................. 2019-141144

(51) Int. Cl.
*B60R 19/48* (2006.01)
*B60R 11/02* (2006.01)
*G01S 13/931* (2020.01)
*B60R 11/00* (2006.01)

(52) U.S. Cl.
CPC ............ *B60R 11/02* (2013.01); *B60R 19/483* (2013.01); *G01S 13/931* (2013.01); *B60R 2011/004* (2013.01); *G01S 2013/9323* (2020.01); *G01S 2013/93274* (2020.01); *G01S 2013/93275* (2020.01)

(58) Field of Classification Search
CPC ...................................... B60R 11/02
USPC ...................................... 73/866.5
See application file for complete search history.

(56) References Cited

U.S. PATENT DOCUMENTS

| 10,793,095 B2 | 10/2020 | Horiuchi et al. |
| 2016/0282155 A1 | 9/2016 | Hara |
| 2016/0291151 A1 | 10/2016 | Dechoux |

FOREIGN PATENT DOCUMENTS

| CN | 102133883 A | 7/2011 |
| JP | 2017139570 A | 8/2017 |
| JP | 6202028 B2 | 9/2017 |
| JP | 6254183 B2 | 12/2017 |

(Continued)

OTHER PUBLICATIONS

Horiuchi et al. Machine Translation of WO-2020162201-A1. Published Aug. 2020. Accessed Jun. 2023. (Year: 2020).*

(Continued)

*Primary Examiner* — Walter L Lindsay, Jr.
*Assistant Examiner* — Philip T Fadul
(74) *Attorney, Agent, or Firm* — Armstrong Teasdale LLP

(57) ABSTRACT

A sensor attachment structure for a side part of a vehicle body includes: a side panel part facing substantially sideward; a rear panel part facing substantially rearward; a lower panel part facing substantially downward; a sensor attachment member to which a sensor configured to detect surrounding information on a lateral side of a vehicle is attached; a side joined member extending from the sensor attachment member toward the side panel part and joined to the side panel part; a rear joined member extending from the sensor attachment member toward the rear panel part and joined to the rear panel part; and a lower joined member extending from the sensor attachment member toward the lower panel part and joined to the lower panel part.

11 Claims, 7 Drawing Sheets

(56) References Cited

FOREIGN PATENT DOCUMENTS

JP        2018134936 A       8/2018
WO    WO-2020162201 A1 *  8/2020

OTHER PUBLICATIONS

Office Action for Chinese Patent Application 202010749201.7 dated Sep. 15, 2023; 7 pp.

* cited by examiner

SENSOR ATTACHMENT STRUCTURE FOR SIDE PART OF VEHICLE BODY

TECHNICAL FIELD

The present invention relates to a sensor attachment structure for a side part of a vehicle body, and more particularly, to an attachment structure of a sensor that detects surrounding information on a lateral side of a vehicle.

BACKGROUND ART

A vehicle (for example, an automobile) known in the art is provided with a sensor (for example, a radar or a lidar) attached to a vehicle body to detect surrounding information of the vehicle for executing automatic driving or driving assistance.

Such a sensor is attached to a high rigidity member such as a bumper beam or a skeleton member with a closed section structure so that the sensor is less likely to vibrate due to travel vibrations of the vehicle and the like (for example, JP6254183B2 and JP6202028B2).

In a conventional sensor attachment structure, a sensor can be attached only to a high rigidity member such as a bumper beam or a skeleton member with a closed section structure. This decreases flexibility of an attachment position of the sensor, and thus it may be difficult to arrange the sensor in a part and direction suitable for detecting surrounding information of a vehicle.

SUMMARY OF THE INVENTION

In view of such a problem of the prior art, a primary object of the present invention is to provide a sensor attachment structure that can increase flexibility of an attachment position of a sensor and thus arrange the sensor in a part and direction suitable for detecting surrounding information of a vehicle while ensuring rigidity required for an attachment of the sensor.

To achieve such an object, one embodiment of the present invention provides a sensor attachment structure (4) for a side part of a vehicle body (2), including: a side panel part (30) facing substantially sideward; a rear panel part (32) facing substantially rearward; a lower panel part (28, 33) facing substantially downward; a sensor attachment member (42) to which a sensor (68) configured to detect surrounding information on a lateral side of a vehicle is attached; a side joined member (44) extending from the sensor attachment member toward the side panel part and joined to the side panel part; a rear joined member (46) extending from the sensor attachment member toward the rear panel part and joined to the rear panel part; and a lower joined member (48) extending from the sensor attachment member toward the lower panel part and joined to the lower panel part.

According to this arrangement, the sensor attachment member is joined to the side panel part, the rear panel part, and the lower panel part, which face directions different from each other, via each of the joined members. Accordingly, vibrations and loads are dispersed in different three surfaces, so that the rigidity required for the attachment of the sensor can be secured even if each of the panel parts is made of a thin plate. Accordingly, the attachment part of the sensor is not limited to a high rigidity member that constitutes the vehicle body, and thus the flexibility of the attachment position of the sensor is increased, so that the sensor can be arranged in a part and direction suitable for detecting the surrounding information of the vehicle.

Preferably, in the above sensor attachment structure, the side panel part, the rear panel part, and the lower panel part define a corner part (A) at which three surfaces thereof join each other; and in a vicinity of the corner part, the side joined member, the rear joined member, and the lower joined member are joined to the side panel part, the rear panel part, and the lower panel part, respectively.

According to this arrangement, the corner part with high rigidity is utilized for a joining part of each of the joined members. Accordingly, desired strength of the sensor attachment structure can be obtained even if each of the panel parts is thin, so that a lightweight and inexpensive sensor attachment structure can be manufactured.

Preferably, in the above sensor attachment structure, in the vicinity of the corner part, the side panel part is provided with an air discharge opening (31) for discharging air from an inside of a vehicle cabin to an outside thereof.

According to this arrangement, even if the strength and rigidity of the side panel part are decreased due to the formation of the air discharge opening, such decrease in the strength and rigidity can be compensated by the sensor attachment member.

Preferably, in the above sensor attachment structure, the sensor attachment member is made of a plate, and the side joined member and the rear joined member are separate from the sensor attachment member and joined to the sensor attachment member at flange parts (42B, 42F) formed in both the side joined member and the rear joined member and/or the sensor attachment member.

According to this arrangement, each member is manufactured easily by bending a steel plate, and thus the shape, plate thickness, and material of each member can be optimized according to the input load, so that a lightweight and inexpensive sensor holding structure can be obtained.

Preferably, in the above sensor attachment structure, the side joined member, the rear joined member, and the lower joined member each include a joined part joined to the side panel part, the rear panel part, and the lower panel part, respectively, and the joined part is positioned higher than the sensor attached to the sensor attachment member.

According to this arrangement, tensile loads act on the side joined member, the rear joined member, and the lower joined member when the sensor vibrates vertically according to the own weight of the sensor and the vibration of the vehicle. Accordingly, each of these joined members is less likely to be buckled and deformed, so that these joined members can be made thinner.

Preferably, in the above sensor attachment structure, the sensor attachment member and the sensor are positioned more rearward than a rear wheel (10) positioned at a rear part of the vehicle body, more forward than a design surface (25) of a rear bumper face (24), more outward than a high temperature part (80) present below the rear part of the vehicle body, and more inward than the design surface of the rear bumper face, and the sensor is positioned lower than a lower end of a rear bumper beam (18) positioned at the rear part of the vehicle body.

According to this arrangement, the flexibility of the location of the sensor can be increased by utilizing a dead space which is not provided with a skeleton of the vehicle and thus not suitable for the attachment part of parts of the vehicle.

Preferably, in the above sensor attachment structure, the sensor attachment member includes a part positioned between the sensor and the high temperature part, and a heat insulation layer (78) that separates the sensor attachment member from the sensor is formed between the sensor attachment member and the sensor.

According to this arrangement, even if the sensor is positioned near the high temperature part, the sensor can be protected from heat without another member such as a heat shield plate.

Preferably, in the above sensor attachment structure, the sensor attachment member includes a lower flange part (42C) positioned lower than the sensor and extending toward an outside of the vehicle, the rear bumper face includes a bumper lower surface (24A) positioned lower than the lower flange part and extending toward an inside of the vehicle, an outer end (42E) of the lower flange part and an inner end (24B) of the bumper lower surface are located at substantially the same position in a lateral direction and separated from each other in a vertical direction, and a gap (G) is formed between the outer end of the lower flange part and the inner end of the bumper lower surface.

According to this arrangement, the lower flange part of the sensor attachment member and the inner end of the bumper lower surface are located at substantially the same position in the lateral direction and thus no gap is present therebetween in the lateral direction. Accordingly, water or stones thrown up by the rear wheel can be prevented from directly hitting the sensor while the vehicle is traveling. Further, the gap is formed in the vertical direction between the lower flange part of the sensor attachment member and the inner end of the bumper lower surface, and thus the sensor can be seen when the gap is looked up from lower and inner sides of the vehicle. Accordingly, the sensor can be visually recognized, so that work efficiency can be improved.

Preferably, in the above sensor attachment structure, the rear bumper face is provided with an opening (70) at a position corresponding to a lateral side of the sensor, and a sealing member (72) is provided between an outer circumferential surface of the sensor and an inner circumferential edge of the opening.

According to this arrangement, even if the sensor faces sideward via the opening of the rear bumper face, the exposure of the sensor to the outside of the vehicle can be minimized by using the sealing member, so that the sensor can be protected from water, flying stones, and dust.

Preferably, in the above sensor attachment structure, rear and side edges (20A, 20B) of the rear bumper beam join each other at an outer end (20C) of the rear bumper beam, and the sensor attachment member, the sensor, and the sealing member are positioned more forward than a hypothetical plane (F) inclined by a prescribed inclination angle (θ) toward an inside of the vehicle in a plan view around a vertical axis passing through the outer end of the rear bumper beam.

According to this arrangement, the sensor attachment member, the sensor, and the sealing member are positioned more forward than a possible entrance area of an opponent vehicle at a time of a light collision from a diagonally rear side, so that the sensor can be protected from the light collision therefrom by using the rear bumper beam.

Preferably, in the above sensor attachment structure, an adjustment screw (67) for adjusting an attachment angle of the sensor is accessible from the lateral side of the vehicle via the opening.

According to this arrangement, by simply removing the sealing member, the attachment angle of the sensor can be adjusted without removing the rear bumper face, so that work efficiency can be improved.

Thus, according to an embodiment of the present invention, it is possible to provide a sensor attachment structure that can increase flexibility of an attachment position of a sensor without limiting the attachment part of the sensor to a high rigidity member that constitutes a vehicle body, and thus arrange the sensor in a part and direction suitable for detecting surrounding information of a vehicle while ensuring rigidity required for an attachment of the sensor.

DESCRIPTION OF THE PREFERRED EMBODIMENT(S)

In the following, a sensor attachment structure 4 according to an embodiment of the present invention will be described with reference to FIGS. 1 to 7.

Figure 1:
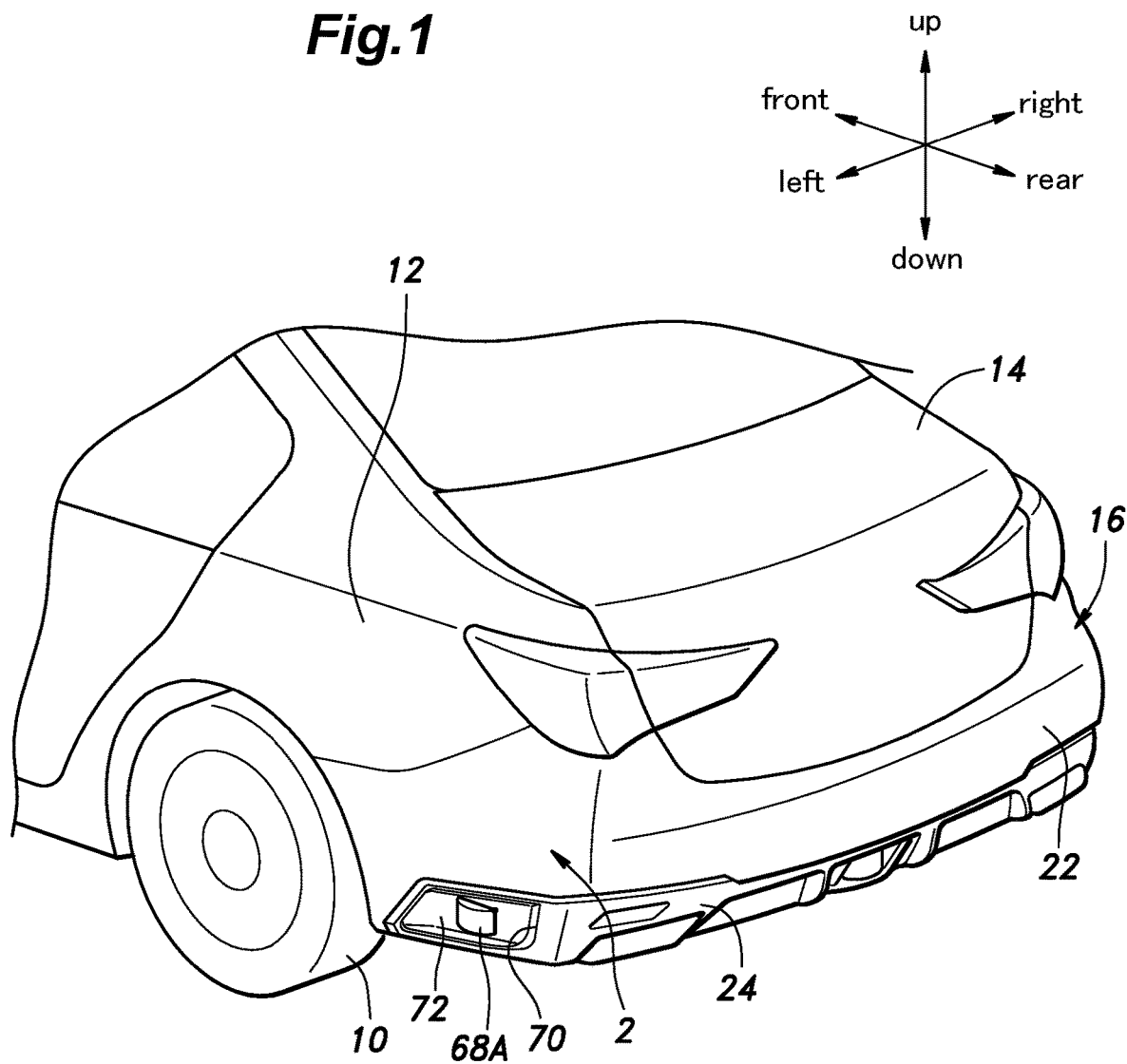
FIG. 1 is a rear perspective view showing a vehicle provided with a sensor attachment structure according to an embodiment of the present invention.
Figure 2:
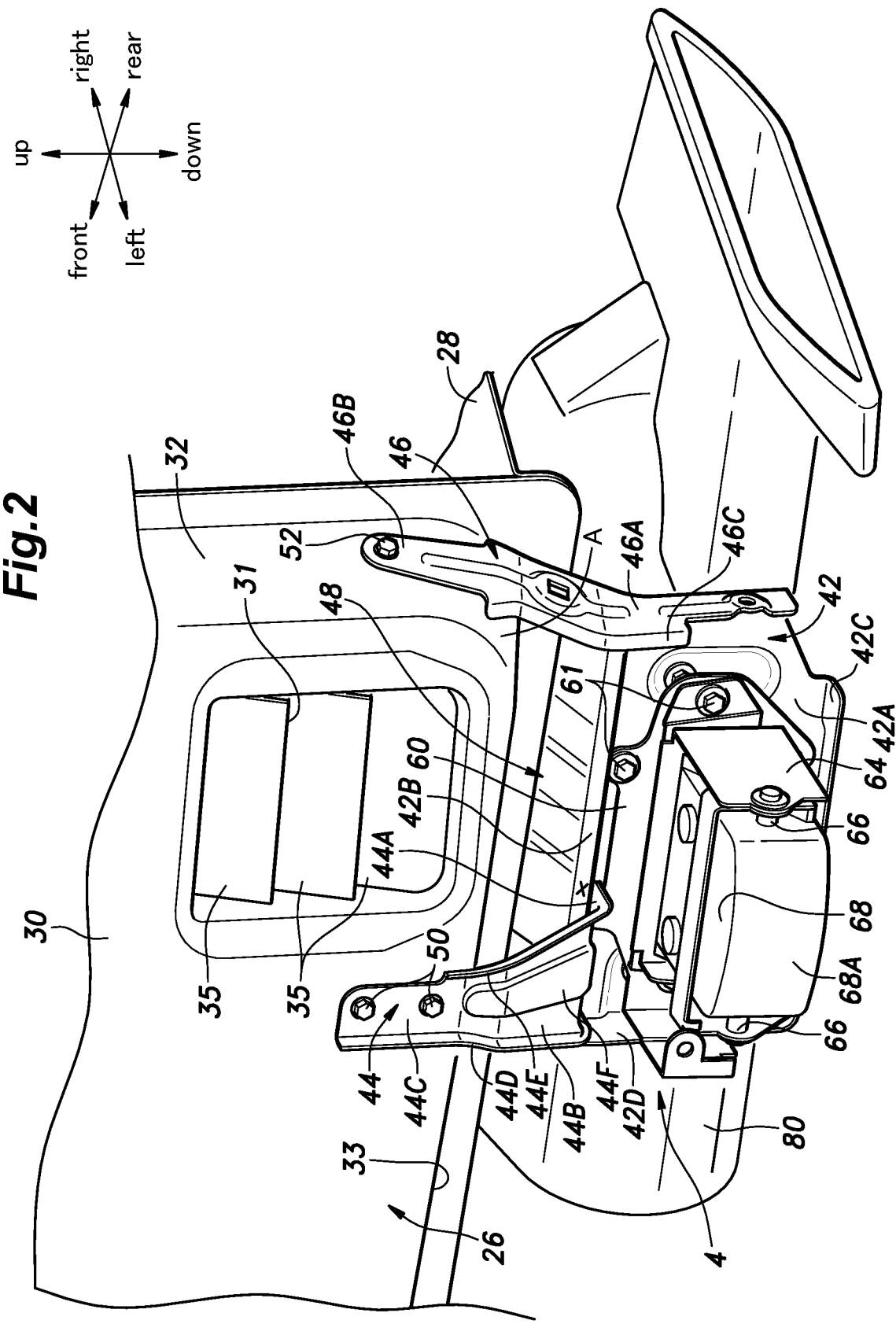
FIG. 2 is a perspective view showing the sensor attachment structure according to the embodiment.

First, a vehicle (for example, an automobile) provided with the sensor attachment structure 4 according to the embodiment will be described with reference to FIG. 1. A rear structure of the vehicle includes left and right rear side outer panels 12 (only the left one is shown in FIG. 1) that compose wheelhouses of rear wheels 10, a rear trunk lid 14, and a rear bumper 16. The rear bumper 16 includes a rear bumper beam 20 (see FIG. 3) with a substantially rectangular cross section, an upper bumper face 22, and a lower bumper face 24 (an example of a rear bumper face). The rear bumper beam 20 extends in the lateral direction, and is attached to rear ends of left and right rear side frames (not shown) via bumper brackets 18 (see FIG. 3) that compose a part of a structural member provided in a rear part of a vehicle body 2. The upper bumper face 22 and the lower bumper face 24 are attached to the rear bumper beam 20.

Next, the sensor attachment structure 4 according to the embodiment of the present invention will be described with reference to FIGS. 2-7.

The rear structure of the vehicle further includes left and right rear side inner panels 26 (only the left one is shown in the drawings) and a rear floor panel 28. The left and right edges of the rear floor panel 28 are joined to the corresponding rear side inner panels 26.

Each rear side inner panel 26 includes a side panel part 30 facing substantially sideward and a rear panel part 32 facing substantially rearward. Each rear side inner panel 26 further includes a lower panel part 33 formed continuously with the rear panel part 32 and facing substantially downward. The rear floor panel 28 serves as a lower panel part facing substantially downward. In the following, the rear floor panel 28 may be referred to as "the lower panel part 28".

The side panel part 30, the rear panel part 32, and the lower panel part 33 define a corner part A at which three surfaces of these panel parts 30, 32, 33 join each other. Incidentally, the lower panel part 33 of each rear side inner panel 26 and the rear floor panel 28 serving as the lower panel part 28 may be composed of equivalent panel members, and formed separately or integrally.

The side panel part 30 is provided with an opening in the vicinity of the corner part A (for example, in a position nearer to the corner part A than the rear wheel 10), and the opening is provided with an air discharge opening 31 for discharging air from an inside of a vehicle cabin 6 to an outside thereof. The air discharge opening 31 is provided with louvers 35.

The sensor attachment structure 4 includes a sensor holding structure 40 formed by joining four elements by welding and bolts and nuts. Each of the above four elements is formed by pressing a plate material. The above four elements are a sensor attachment member 42, a side joined member 44, a rear joined member 46, and a lower joined member 48.

The sensor attachment member 42 includes a substantially rectangular main part 42A, an upper flange part 42B (a bent piece), a lower flange part 42C (a bent piece), a front flange part 42D (a bent piece), and a rear flange part 42F (a bent piece). The main part 42A faces substantially sideward so that a sensor 68 configured to detect surrounding information on a lateral side (a left side or a right side) of the vehicle can be attached to the main part 42A. The upper flange part 42B is bent from an upper edge of the main part 42A and extends toward an outside in the lateral direction of the vehicle. The lower flange part 42C is bent from a lower edge of the main part 42A and extends toward the outside in the lateral direction of the vehicle. The front flange part 42D is bent from a front edge of the main part 42A and extends toward the outside in the lateral direction of the vehicle. The rear flange part 42F is bent from a rear edge of the main part 42A and extends toward the outside in the lateral direction of the vehicle. By bending the edges of the main part 42A in this manner, the sensor attachment member 42 has high bending rigidity and high torsion rigidity even if made of a thin plate.

A base end 44A of the side joined member 44 overlaps with the upper flange part 42B and is welded to the upper flange part 42B. The side joined member 44 includes a plate part 44B that extends upward from the sensor attachment member 42 (more specifically, from the upper flange part 42B) toward the side panel part 30. The plate part 44B includes a free end 44C (an example of a joined part) parallel to the side panel part 30. In the vicinity of the corner part A (for example, in a position nearer to the corner part A than the rear wheel 10), the free end 44C of the plate part 44B of the side joined member 44 is joined to the side panel part 30 by bolts and nuts 50. The plate part 44B is provided with bent pieces 44D and 44E (bent ribs) and an embossed piece 44F (an embossed rib). The bent pieces 44D, 44E extend along each of front and rear edges of the plate part 44B. The embossed piece 44F extends in the longitudinal direction of the plate part 44B. Since the side joined member 44 is provided with the above pieces 44D, 44E, 44F, the side joined member 44 has high bending rigidity and high torsion rigidity even if made of a thin plate.

The rear joined member 46 includes a plate part 46A that extends upward from a rear edge of the sensor attachment member 42 toward the rear panel part 32. The plate part 46A includes a free end 46B (an example of a joined part) parallel to the rear panel part 32. In the vicinity of the corner part A (for example, in a position nearer to the corner part A than the rear wheel 10), the free end 46B of the plate part 46A of the rear joined member 46 is joined to the rear panel part 32 by a bolt and nut 52. The plate part 46A is provided with bent pieces 46C, 46D (bent ribs) extending along each of left and right edges (each of inner and outer edges) of the plate part 46A. The plate part 46A overlaps with the rear flange part 42F and is welded to the rear flange part 42F. The bent piece 46D overlaps with the main part 42A and welded to the main part 42A. Since the rear joined member 46 is provided with the bent pieces 46C, 46D, the rear joined member 46 has high bending rigidity and high torsion rigidity even if made of a thin plate.

A lower end 48A of the lower joined member 48 is joined to a vertically intermediate part of the main part 42A by bolts and nuts 54. The lower joined member 48 extends obliquely upward from the lower end 48A toward the lower panel part 28. The lower joined member 48 includes a plate part 48B (an upper end) that serves as a free end 48D (an example of a joined part) parallel to the lower panel part 28. In the vicinity of the corner part A (for example, in a position nearer to the corner part A than the rear wheel 10), the free end 48D (namely, the plate part 48B) of the lower joined member 48 is joined to the lower panel part 28 by bolts and nuts 56. The lower joined member 48 is provided with embossed pieces 48C (embossed ribs) over the entire area from the lower end 48A to the plate part 48B. Thereby, the lower joined member 48 has high bending rigidity and high torsion rigidity even if made of a thin plate.

In this way, the sensor holding structure 40 is composed of four parts of the sensor attachment member 42, the side joined member 44, the rear joined member 46, and the lower joined member 48. Thereby, the sensor attachment member 42 and each joined member 44, 46, 48 can be manufactured easily by bending a steel plate. Further, the shape, plate thickness, and material of the sensor attachment member 42 and each joined member 44, 46, 48 can be optimized according to the input load, so that a lightweight and inexpensive sensor holding structure 40 can be obtained.

An attachment base plate 60 is fixed to the main part 42A of the sensor attachment member 42 via a plurality of bolts and nuts 61. A sensor support member 64 (a sensor support yoke) is attached to the attachment base plate 60 via a bolt and nut 62. The sensor support member 64 supports the sensor 68 via a support shaft 66 such that the sensor 68 is rotatable around a horizontal axis extending in the fore and aft direction. The sensor 68 consists of a radar and/or a lidar, for example, and detects the surrounding information on the lateral side of the rear part of the vehicle. The sensor 68 has a water-resistant detection surface 68A (an emitting and receiving surface of a radio wave and/or a light beam) that faces outward in the lateral direction.

As described above, the sensor attachment member 42 to which the sensor 68 is attached is supported by the side panel part 30, the rear panel part 32, and the lower panel part 28 via the side joined member 44, the rear joined member 46, and the lower joined member 48, and each joined member 44, 46, 48 is joined to each panel part 30, 32, 28 in different directions. Accordingly, vibrations and loads are dispersed in different three surfaces, so that the rigidity required for the attachment of the sensor 68 can be secured even if each panel part 30, 32, 28 is made of a thin plate. Accordingly, the attachment part of the sensor 68 is not limited to a high rigidity member that constitutes the vehicle body 2, and thus the flexibility of the attachment position of the sensor 68 is increased, so that the sensor 68 can be arranged in a part and direction suitable for detecting the surrounding information of the vehicle.

Further, the side joined member 44, the rear joined member 46, and the lower joined member 48 each include a joined part (namely, the free ends 44C, 46B, 48D) joined to the side panel part 30, the rear panel part 32, and the lower panel part 28, respectively, and the joined part of each joined member 44, 46, 48 is positioned higher than the sensor 68 attached to the sensor attachment member 42. Accordingly, tensile loads act on each joined member 44, 46, 48 when the sensor 68 vibrates vertically according to the own weight of the sensor 68 and the vibration of the vehicle. Thereby, the sensor 68 can be supported stably, so that the sensor 68 can improve the detection accuracy of the surrounding information. Also, each joined member 44, 46, 48 can be made thinner, and thus the weight of the sensor holding structure 40 can be reduced.

In contrast, if the joined part of each joined member 44, 46, 48 is positioned lower than the sensor 68, compressive loads may act on each joined member 44, 46, 48 when the sensor 68 vibrates vertically according to the own weight of the sensor 68 and the vibration of the vehicle. As a result, each joined member 44, 46, 48 is likely to be buckled and deformed and thus the sensor 68 becomes unstable, so that the sensor 68 may deteriorate the detection accuracy of the surrounding information. Thereby, reinforcement such as an increase in the plate thickness of each joined member 44, 46, 48 may be necessary.

Furthermore, the joined part of each joined member 44, 46, 48 is arranged in the vicinity of the corner part A, which has high rigidity by joining three surfaces of the side panel part 30, the rear panel part 32, and the lower panel part 33. Accordingly, the rigidity required for supporting the sensor 68 stably can be ensured even by thin plates that may compose outer plates of the vehicle. Thus, it is not necessary to thicken each panel part 30, 32, 33, strengthen the material of each panel part 30, 32, 33, and add a reinforcing member, so that lightweight and inexpensive panel parts 30, 32, 33 can be manufactured. Incidentally, the panel parts 30, 32, 33 may be composed of one element or separate elements.

The joined parts of the joined members 44, 46, 48 are arranged such that the opening (namely, the air discharge opening 31) of the side panel part 30 is interposed between the joined parts of the joined members 44, 46, 48 in the fore and aft direction and the lateral direction, and the sensor attachment member 42 reinforces the side panel part 30. Accordingly, the decrease in the rigidity of the side panel part 30 due to the formation of the air discharge opening 31 is compensated.

The sensor attachment member 42 and the sensor 68 are positioned more rearward than the rear wheels 10, more forward than design surfaces 25 (rear surfaces) of the upper bumper face 22 and the lower bumper face 24, more outward in the lateral direction than an engine exhaust device 80 as a high temperature part present below the rear part of the vehicle body 2, and more inward in the lateral direction than the design surfaces 25 (outside surfaces in the lateral direction) of the upper bumper face 22 and the lower bumper face 24. Also, the sensor 68 is positioned lower than a lower end of the rear bumper beam 20.

A space surrounded by the rear wheels 10, the upper bumper face 22, the lower bumper face 24, and the engine exhaust device 80 is not provided with a skeleton of the vehicle. Thereby, this space is a dead space that does not contribute much to the strength and rigidity against a collision of the vehicle and is not suitable for the attachment parts of elements of the vehicle. By utilizing such a dead space as a space for locating the sensor 68, the flexibility of the location of the sensor 68 can be increased. Incidentally, in a case where the vehicle is an electric vehicle (for example, an electric automobile), the high temperature part may be an electric motor or a battery. Further, in a case where the vehicle is a fuel cell vehicle (for example, a fuel cell automobile), the high temperature part may be a generation part of high temperature steam or hot water generated according to power generation.

Figure 5:
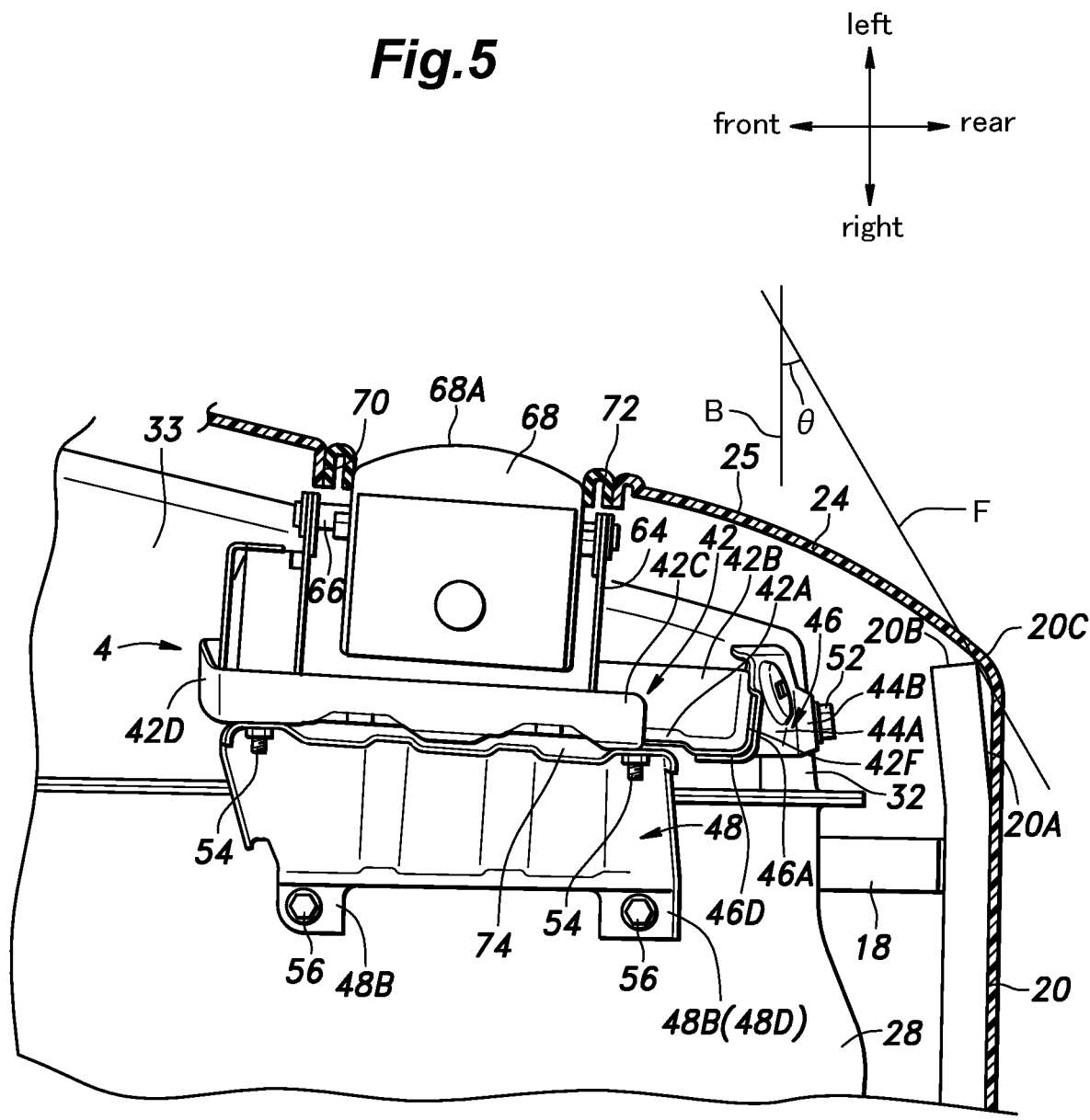
FIG. 5 is a bottom view showing the sensor attachment structure according to the embodiment.

As shown in FIG. 5, a rear edge 20A and a side edge 20B (an outer edge in the lateral direction) of the rear bumper beam 20 join (cross) each other at an outer end 20C in the lateral direction of the rear bumper beam 20. The sensor holding structure 40 including the sensor attachment member 42, the sensor 68, and a sealing member 72 are positioned more forward than a hypothetical plane F. In the plan view, the hypothetical plane F is inclined by a prescribed inclination angle $\theta$ toward an inside in the lateral direction of the vehicle with respect to a vertical surface B extending in the lateral direction. Also, the hypothetical plane F is inclined around a vertical axis which is in contact with the outer end 20C of the rear bumper beam 20, namely, around a vertical axis passing through the outer end 20C of the rear bumper beam 20.

At a time of a light collision from a diagonally rear side, an opponent vehicle may be in contact with the rear bumper beam 20 before being in contact with the sensor holding structure 40, the sensor 68, and the sealing member 72, and thus prevented from further going forward. Namely, the sensor holding structure 40, the sensor 68, and the sealing member 72 are positioned forward than a possible entrance area of the opponent vehicle at the time of the light collision from the diagonally rear side, so that the rear bumper beam 20 can function as a protection member of the sensor holding structure 40, the sensor 68, and the sealing member 72. Thus, the sensor 68 and the sealing member 72 can be protected from the light collision from the diagonally rear side.

The above "light collision from the diagonally rear side" is an offset collision from a rear side at a relatively low speed, and is a comparatively minor collision that may allow the vehicle to travel after the collision. The inclination angle $\theta$ of the hypothetical plane F may be set to about 25 degrees to 35 degrees in consideration of the statistical frequency of the light collision.

Figure 6:
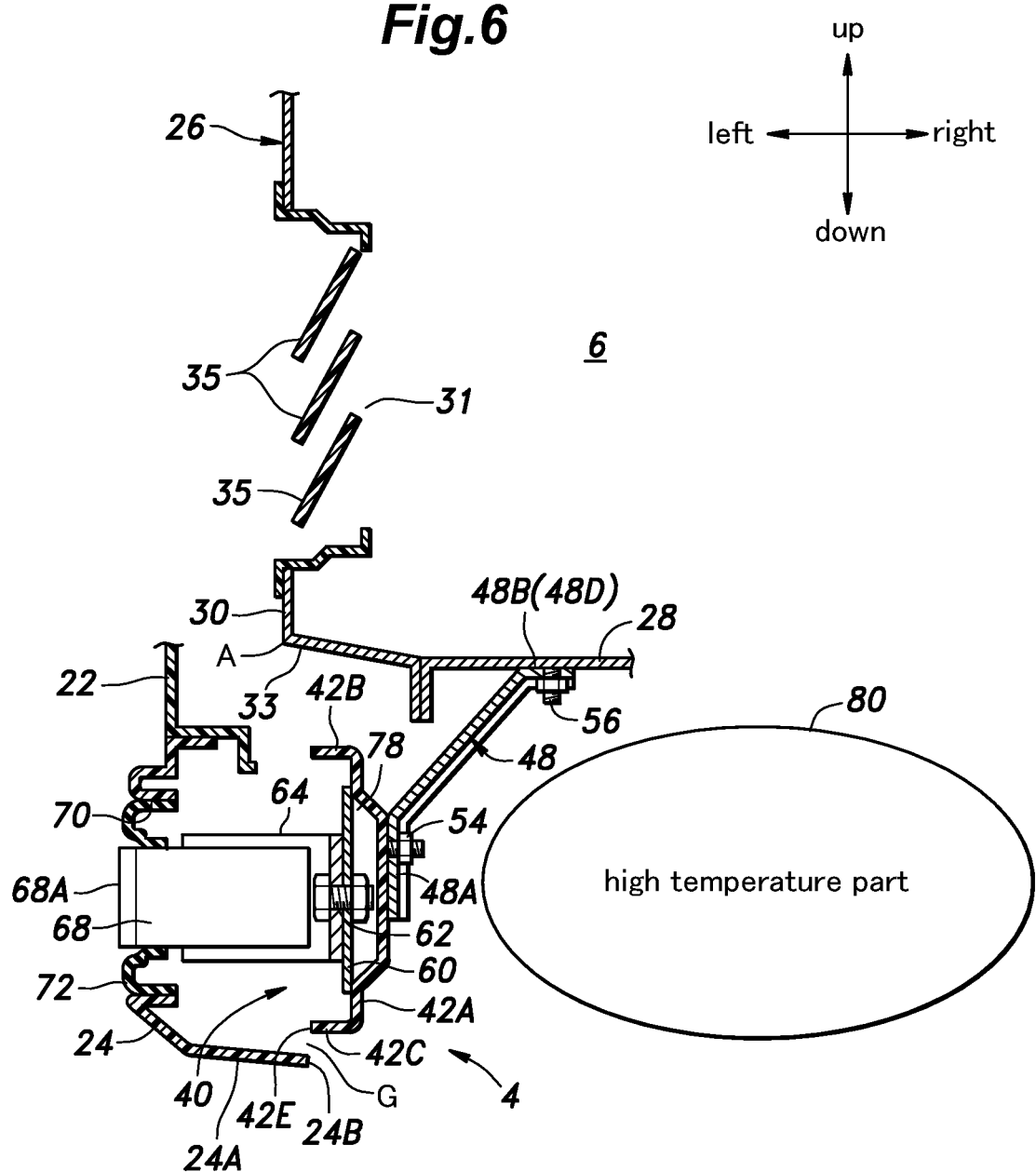
FIG. 6 is a vertical sectional view of a main part of the sensor attachment structure according to the embodiment.
Figure 7:
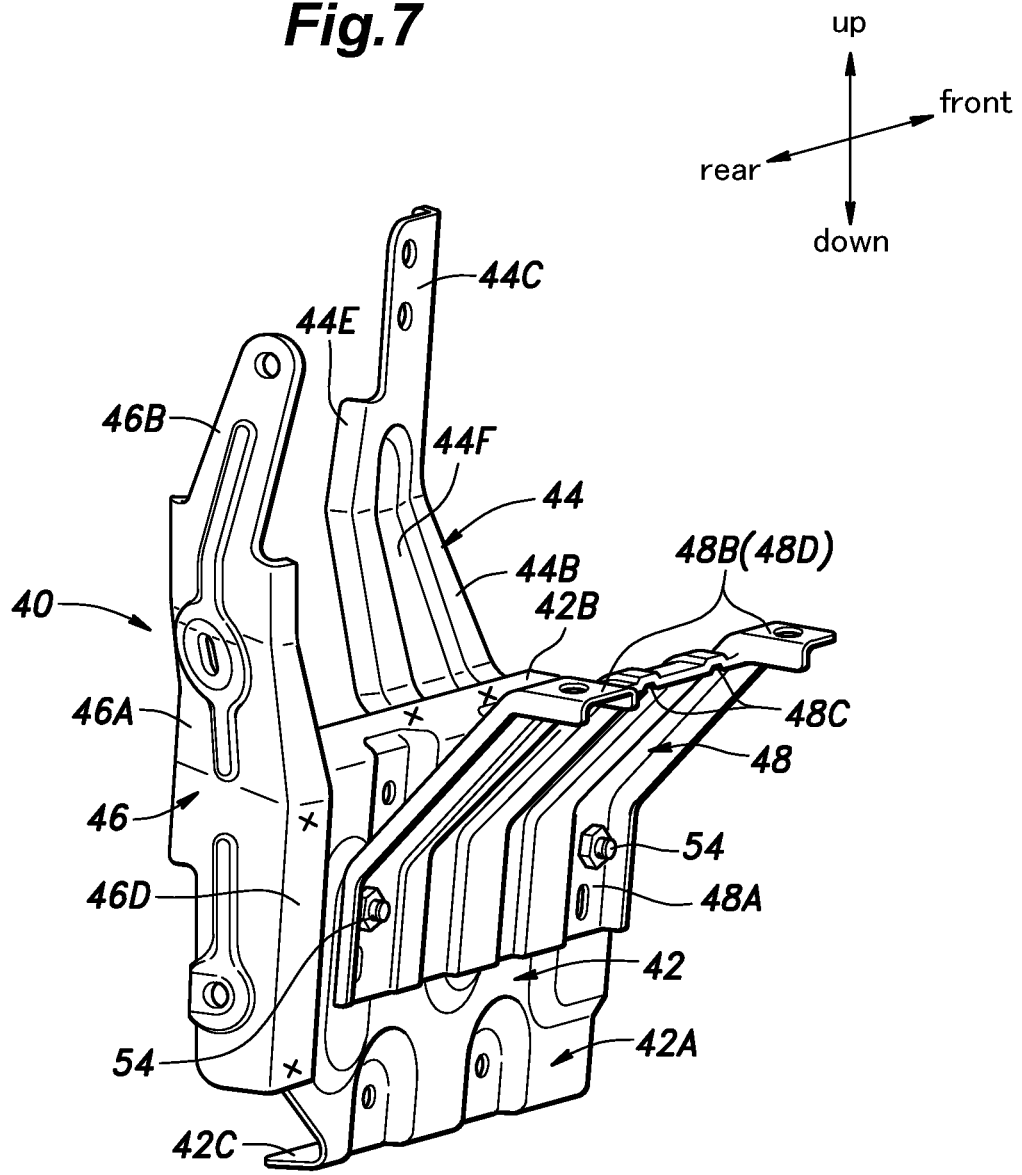
FIG. 7 is a perspective view showing a sensor holding structure used in the sensor attachment structure according to the embodiment.

As shown in FIG. 6, the sensor attachment member 42 includes the main part 42A positioned between the sensor 68 and the engine exhaust device 80. As shown in FIG. 5, a heat insulation layer 74 (an air gap) that separates the sensor attachment member 42 from the lower joined member 48 is formed between the sensor attachment member 42 and the lower joined member 48. As shown in FIG. 6, a heat insulation layer 78 (an air gap) that separates the sensor attachment member 42 from the sensor 68 (the attachment base plate 60) in the lateral direction is formed between the sensor attachment member 42 and the sensor 68 (the attachment base plate 60) in the vicinity of the bolt and nut 62

Accordingly, even if the sensor 68 is positioned near the engine exhaust device 80 as the high temperature part, the sensor 68 can be protected from heat without a heat shield such as a heat baffle.

As shown in FIG. 6, the lower bumper face 24 includes a bumper lower surface 24A positioned lower than the lower flange part 42C of the sensor attachment member 42 and extending toward the inside in the lateral direction of the vehicle. An outer end 42E of the lower flange part 42C and an inner end 24B of the bumper lower surface 24A are located at substantially the same position in the lateral direction and separated from each other in the vertical direction. Accordingly, a gap G is formed between the outer end 42E of the lower flange part 42C and the inner end 24B of the bumper lower surface 24A.

In the plan view, no gap is present in the lateral direction between the outer end 42E of the lower flange part 42C and the inner end 24B of the bumper lower surface 24A. Accordingly, water or stones thrown up by the rear wheels 10 can be prevented from directly hitting the sensor 68 while the vehicle is traveling. Further, the gap G is formed in the vertical direction between the outer end 42E of the lower flange part 42C and the inner end 24B of the bumper lower surface 24A, and thus the sensor 68 can be seen when the gap G is looked up from lower and inner sides of the vehicle. Accordingly, an attachment condition of the sensor 68 and attachment/detachment of a sensor connector (not shown) can be visually recognized, so that work efficiency can be improved.

Figure 3:
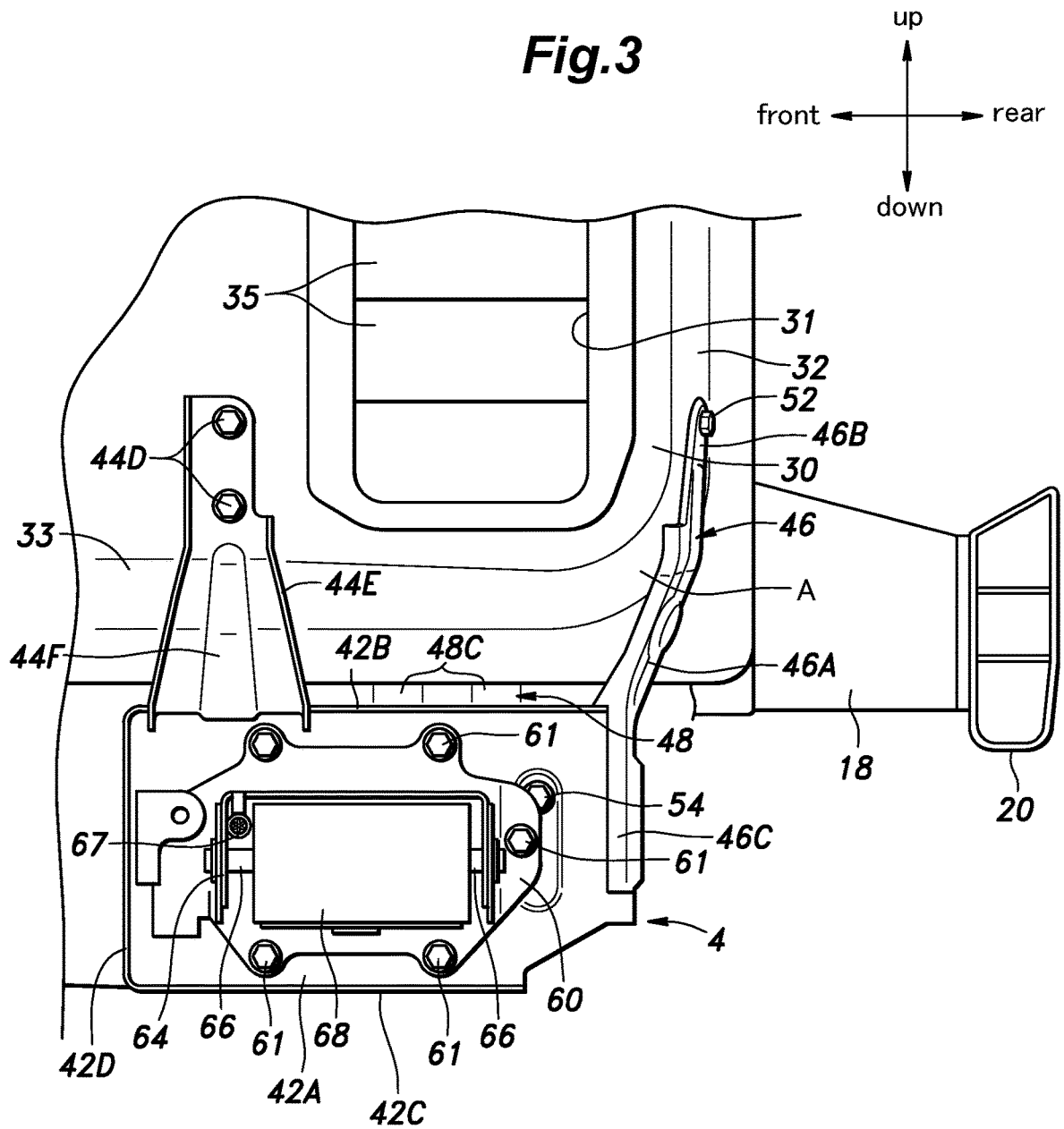
FIG. 3 is a side view showing the sensor attachment structure according to the embodiment.
Figure 4:
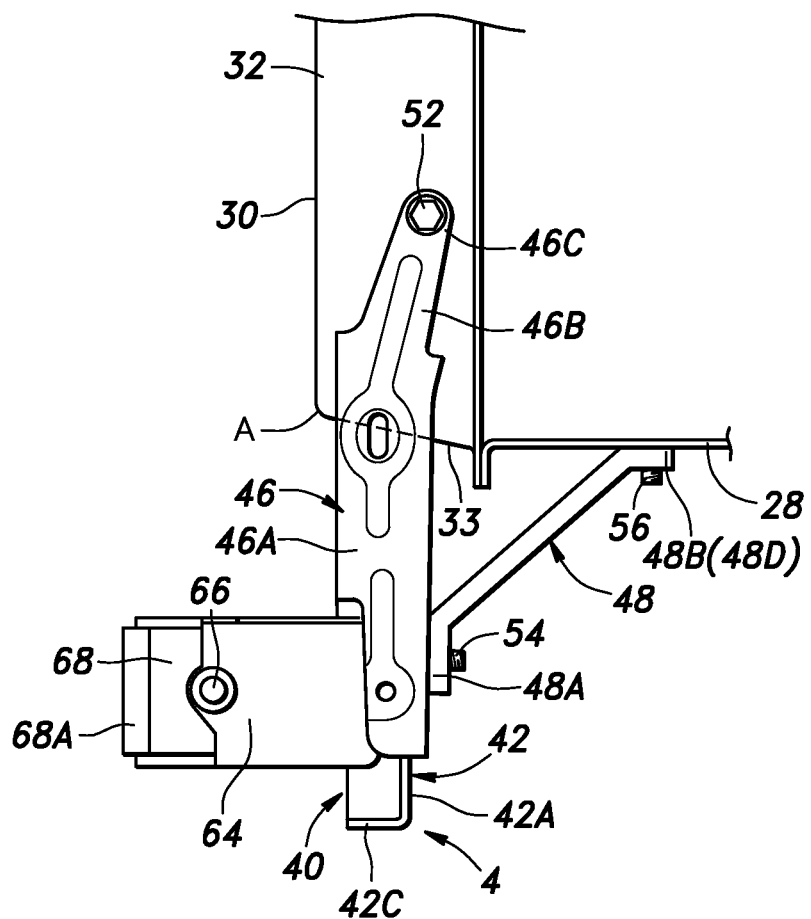
FIG. 4 is a rear view showing the sensor attachment structure according to the embodiment.

As shown in FIG. 3, an adjustment screw 67 for adjusting an attachment angle of the sensor 68 is provided between the sensor support member 64 and the sensor 68. According to a rotation of the adjustment screw 67, the sensor 68 is rotated around a horizontal axis extending in the fore and aft direction with respect to the sensor support member 64, and thus the attachment angle of the sensor 68 is adjusted. The adjustment screw 67 has a central axis in the lateral direction and a screw head at the outer end in the lateral direction. Accordingly, the adjustment screw 67 is accessible from the lateral side of the vehicle, and the access direction of the tool that rotates the adjustment screw 67 is the lateral direction.

The lower bumper face 24 is provided with a substantially rectangular opening 70 (window) at a position corresponding to a lateral side of the sensor 68. A sealing member 72 is provided between an outer circumferential surface of the sensor 68 and an inner circumferential edge of the opening 70 of the lower bumper face 24. The sealing member 72 is fixed to the inner circumferential edge or its vicinity of the lower bumper face 24 and abuts against the outer circumferential surface of the sensor 68.

Accordingly, only the water-resistant detection surface 68A of the sensor 68 is exposed to the outside in the lateral direction, and thus the sensor 68 is protected from water, flying stones, and dust. The sealing member 72 may be attached to the sensor 68 via a rubber member or a sponge member which is elastically deformable, and may be fixed to the lower bumper face 24 via a bolt or a clip, or fitted to the lower bumper face 24. According to such a configuration, the attachment error of the lower bumper face 24 with respect to the vehicle body 2 does not affect the attachment accuracy of the sensor 68 with respect to the vehicle body 2.

The opening 70 has a size to allow the screw head of the adjustment screw 67 to be exposed to the outside in the lateral direction. Thus, in a state where the sealing member 72 is removed, the screw head of the adjustment screw 67 is accessible from the lateral side of the vehicle via the opening 70. Accordingly, by simply removing the sealing member 72, the attachment angle of the sensor 68 can be adjusted without removing the rear bumper 16, so that work efficiency can be improved.

Incidentally, the adjustment screw 67 may have a hexalobular screw head, unlike the bolts and nuts 61 for attaching the attachment base plate 60 to the sensor attachment member 42. According to such a configuration, it is possible to distinguish a screwdriver for the adjustment screw 67 from a screwdriver for the bolts and nuts 61. Thus, when the attachment base plate 60 is attached to the sensor attachment member 42 via the bolts and nuts 61, the attachment angle of the sensor 68 can be prevented from being changed by an erroneous operation of the adjustment screw 67.

Concrete embodiments of the present invention have been described in the foregoing, but the present invention should not be limited by the foregoing embodiments and various modifications and alterations are possible within the scope of the present invention. For example, the sensor holding structure 40 may not be composed of separate four elements of the sensor attachment member 42, the side joined member 44, the rear joined member 46, and the lower joined member 48. For example, at least two of the four elements (for example, the sensor attachment member 42 and the lower joined member 48) may be formed integrally as one element, and thus the sensor holding structure 40 may be composed of one element or two or three elements.

Further, not all the structural elements shown in the above embodiments are necessarily indispensable and they may be selectively adopted as appropriate within the scope of the present invention.

The invention claimed is:

1. A sensor attachment structure for a side part of a vehicle body, comprising:
   a side panel part facing sideward;
   a rear panel part facing rearward;
   a lower panel part facing downward;
   a sensor configured to detect surrounding information on a lateral side of a vehicle and having a detection surface facing outward in a lateral direction of the vehicle;
   a sensor attachment member to which the sensor is attached;
   a side joined member extending upward from the sensor attachment member toward the side panel part and joined to the side panel part;
   a rear joined member extending upward from the sensor attachment member toward the rear panel part and joined to the rear panel part; and
   a lower joined member extending obliquely upward from the sensor attachment member toward the lower panel part and joined to the lower panel part.

2. The sensor attachment structure according to claim 1, wherein the sensor attachment member is made of a plate, and
   the side joined member and the rear joined member are separate from the sensor attachment member and joined to the sensor attachment member at flange parts formed in both the side joined member and the rear joined member and/or the sensor attachment member.

3. The sensor attachment structure according to claim 1, wherein the side joined member, the rear joined member, and the lower joined member each include a joined part joined to the side panel part, the rear panel part, and the lower panel part, respectively, and the joined part is positioned higher than the sensor attached to the sensor attachment member.

4. The sensor attachment structure according to claim 1, wherein the sensor attachment member and the sensor are positioned more rearward than a rear wheel positioned at a rear part of the vehicle body, more forward than a design surface of a rear bumper face, outside a high temperature part present below the rear part of the vehicle body, and inside the design surface of the rear bumper face, and
   the sensor is positioned lower than a lower end of a rear bumper beam positioned at the rear part of the vehicle body.

5. The sensor attachment structure according to claim 4, wherein the sensor attachment member includes a part positioned between the sensor and the high temperature part, and a heat insulation layer that separates the sensor attachment member from the sensor is formed between the sensor attachment member and the sensor.

6. The sensor attachment structure according to claim 4, wherein the sensor attachment member includes a lower flange part positioned lower than the sensor and extending toward an outside of the vehicle, the rear bumper face includes a bumper lower surface positioned lower than the lower flange part and extending toward an inside of the vehicle, an outer end of the lower flange part and an inner end of the bumper lower surface are located at the same position in the lateral direction and separated from each other in a vertical direction, and a gap is formed between the outer end of the lower flange part and the inner end of the bumper lower surface.

7. The sensor attachment structure according to claim 4, wherein the rear bumper face is provided with an opening at a position corresponding to a lateral side of the sensor, and a sealing member is provided between an outer circumferential surface of the sensor and an inner circumferential edge of the opening.

8. The sensor attachment structure according to claim 7, wherein rear and side edges of the rear bumper beam join each other at an outer end of the rear bumper beam, and the sensor attachment member, the sensor, and the sealing member are positioned more forward than a hypothetical plane inclined by a prescribed inclination angle toward an inside of the vehicle in a plan view around a vertical axis passing through the outer end of the rear bumper beam.

9. The sensor attachment structure according to claim 7, wherein an adjustment screw for adjusting an attachment angle of the sensor is accessible from the lateral side of the vehicle via the opening.

10. A sensor attachment structure for a side part of a vehicle body, comprising:

a side panel part facing sideward;

a rear panel part facing rearward;

a lower panel part facing downward;

a sensor attachment member to which a sensor configured to detect surrounding information on a lateral side of a vehicle is attached;

a side joined member extending from the sensor attachment member toward the side panel part and joined to the side panel part;

a rear joined member extending from the sensor attachment member toward the rear panel part and joined to the rear panel part; and a lower joined member extending from the sensor attachment member toward the lower panel part and joined to the lower panel part, wherein the side panel part, the rear panel part, and the lower panel part define a corner part at which three surfaces thereof join each other; and in a vicinity of the corner part, the side joined member, the rear joined member, and the lower joined member are joined to the side panel part, the rear panel part, and the lower panel part, respectively.

11. The sensor attachment structure according to claim 10, wherein in the vicinity of the corner part, the side panel part is provided with an air discharge opening for discharging air from an inside of a vehicle cabin to an outside thereof.

* * * * *